(12) United States Patent
Jitsuhara

(10) Patent No.: US 7,656,680 B2
(45) Date of Patent: Feb. 2, 2010

(54) RECEIVING APPARATUS AND BOARD INSTALLATION MEMBER

(75) Inventor: Tsutomu Jitsuhara, Higashiosaka (JP)

(73) Assignee: Sharp Kabushiki Kaisha, Stockholm (SE)

( * ) Notice: Subject to any disclaimer, the term of this patent is extended or adjusted under 35 U.S.C. 154(b) by 0 days.

(21) Appl. No.: 12/260,138

(22) Filed: Oct. 29, 2008

(65) Prior Publication Data

US 2009/0147491 A1 Jun. 11, 2009

(30) Foreign Application Priority Data

Dec. 11, 2007 (JP) ............................. 2007-319489

(51) Int. Cl.
*H05K 1/11* (2006.01)
*H05K 1/14* (2006.01)
(52) U.S. Cl. ................... 361/792; 361/742; 361/759; 361/790; 361/804; 361/770
(58) Field of Classification Search ................. 361/742, 361/756–759, 770, 790, 801–802, 804, 772–774
See application file for complete search history.

(56) References Cited

U.S. PATENT DOCUMENTS 5,946,199 A * 8/1999 Matsuzaki ................... 361/818
6,370,026 B2 * 4/2002 Sunaga et al. ............... 361/719
7,342,800 B2 * 3/2008 Matsuura ..................... 361/759

FOREIGN PATENT DOCUMENTS

JP 11-341375 12/1999
JP 2000-68673 3/2000

* cited by examiner

*Primary Examiner*—Tuan T Dinh
(74) *Attorney, Agent, or Firm*—Nixon & Vanderhye, P.C.

(57) ABSTRACT

A receiving apparatus according to the present invention comprises: a first board including a mount surface whose outer edge is substantially quadrilateral; and a board installation member including a plate portion that has an installation surface whose outer edge is substantially quadrilateral, the first board is installed on the installation surface (called a front surface) side and the surface (called a rear surface) of the rear side of the installation surface is installed on a given second board, the apparatus applies a predetermined processing to a received broadcast signal using a circuit disposed on the first board, and the board installation member includes a connecting terminal to electrically connect the first board with the second board and a leg portion used for the installation on the second board, the connecting terminal protrudes from the plate portion in the direction substantially perpendicular to the plate portion on the front surface side and on the rear surface side, and comes into contact with the first board on the front surface side and comes into contact with the second board on the rear surface side, and the leg portion protrudes from the plate portion in the direction substantially perpendicular to the plate portion on the rear surface side.

16 Claims, 5 Drawing Sheets

RECEIVING APPARATUS AND BOARD INSTALLATION MEMBER

CROSS-REFERENCE TO RELATED APPLICATIONS

This application is based on Japanese Patent Application No. 2007-319489 filed on Dec. 11, 2007, the contents of which are hereby incorporated by reference.

BACKGROUND OF THE INVENTION

1. Field of the Invention

The present invention relates to a board installation member used to install a circuit board and to a receiving apparatus comprising the board installation member.

2. Description of the Related Art

Conventionally, for example, as a receiving apparatus that receives broadcast waves, a receiving apparatus that has a circuit board installed on a metal chassis has been used. A structure of such a receiving apparatus is explained below referring to FIG. 8.

As shown in this figure, a receiving apparatus includes a tuner portion 101 and a main body portion 102 both of which are provided with a circuit board, and installed on a main board 109. The tuner portion 101 and the main body portion 102 are covered with metal chassis 114 and 126, respectively.

The tuner portion 101 comprises a tuner input terminal 111, a tuner circuit portion 112, and an output terminal 113 for an intermediate-frequency signal, while the main body portion 102 comprises input terminals 121 for an intermediate-frequency signal, a first circuit portion 122, a second circuit portion 123, a third circuit portion 124, and image apparatus connecting terminals 125.

In the structure described above, the receiving apparatus receives a digital broadcast wave and inputs broadcast signals into the tuner circuit portion 112 via the tuner input terminal 111. The tuner circuit portion 112 extracts (selects) a predetermined-frequency signal form the broadcast signals, converts it into an intermediate-frequency signal, and outputs it to the main body portion 102 via the output terminal 113.

The main body portion 102 receives the intermediate-frequency signal via the input terminals 121 and transmits it to the first circuit portion 122. The first circuit portion 122 demodulates the received signal and outputs it to the second circuit portion 123. The second circuit portion 123 decompresses the received signal and outputs it to the third circuit portion 124.

The third circuit portion 124 converts the original digital image and sound signals obtained by the decompression processing into analog image and sound signals. And the analog image and sound signals are output to an image apparatus, not shown, and the like via the image apparatus connecting terminals 125.

The chassis (114, 126) which cover the tuner portion 101 and the main body portion 102 are installed on the main board 109 so that the tuner portion 101 and the main body portion 102 are fixed to the main board 109. The chassis (114, 126) are each provided with a protrusion that supports a circuit board fixed inside so that the circuit board is prevented from coming off. The input terminals 121 for intermediate-frequency signals and the image apparatus connecting terminals 125 are installed on the chassis 126. As documents on the prior art, there are JP-A-2000-68673, and JP-A-1999-341375.

In the receiving apparatus described above, when installing the circuit board of the main body portion 102 on the main board 109, the chassis 126 covering the main body portion 102 is used. Accordingly, the chassis 126 is indispensable for the main body portion 102, and it is hard to reduce the size of the main body portion 102. Thus, size reduction of the receiving apparatus is impeded. Besides, because the input terminals 121 and the image apparatus connecting terminals 125 are disposed outside the chassis 126, it is all the more difficult to achieve the size reduction.

In addition, because it is necessary to install the input terminals 121 and the image apparatus connecting terminals 125 on the chassis 126 in advance and to dispose a protrusion and the like to support the circuit board. Therefore, the structure and the fabrication method of the chassis 126 become relatively complicated, which is a factor to impede price reduction of the product.

SUMMARY OF THE INVENTION

The present invention has been made to cope with the conventional problems, and it is an object of the present invention to provide a receiving apparatus and a board installation member which do not require a chassis in the installation step in which a circuit board is fixed to another circuit board, and allow the installation step to be carried out as easily as possible.

To achieve the above object, a receiving apparatus according to the present invention comprises: a first board including a mount surface whose outer edge is substantially quadrilateral; and a board installation member including a plate portion that has an installation surface whose outer edge is substantially quadrilateral, the first board is installed on the installation surface (called a front surface) and the surface (called a rear surface) side of the rear side of the installation surface is installed on a given second board, the apparatus applies a predetermined processing to a received broadcast signal using a circuit disposed on the first board, and the board installation member includes a connecting terminal to electrically connect the first board with the second board and a leg portion used for the installation on the second board, the connecting terminal protrudes from the plate portion in the direction substantially perpendicular to the plate portion on the front surface side and on the rear surface side, and comes into contact with the first board on the front surface side and comes into contact with the second board on the rear surface side, and the leg portion protrudes from the plate portion in the direction substantially perpendicular to the plate portion on the rear surface side.

According to this structure, it is possible to install the first board on the front surface side of the board installation member and to install the rear surface side of the board installation member on the second board. Accordingly, a chassis and the like are not needed in the installation step in which a circuit board (the first board) is installed on another circuit board (the second board). Besides, the connecting terminal to electrically connect the first board with the second board, and the leg portion used for the installation on the second board is so disposed on the board installation member that it protrudes from the plate portion in the direction substantially perpendicular to the plate portion (substantially perpendicular to the front surface and to the rear surface). Accordingly, the installation step in which the first board is installed on the second board can be carried out as easily as possible.

In the foregoing structure, the plate portion may be formed into a frame shape along the outer edge of the installation surface.

According to this structure, even if an apparatus is disposed on the first board's surface opposite to the board installation member and an overhang of the apparatus is present on the surface, it is possible to prevent the overhang from interfering with the plate portion. Accordingly, the installation step to install the first board on the board installation member can be carried out easily.

In the structure described above, the outer edge's shape of the mount surface of the first board may be so formed as to be substantially congruent with the outer edge's shape of the plate portion.

According to this structure, positioning is easy when installing the first board on the board installation member, and the installation step can be eased.

In the structure described above, at each of the four corners of the plate portion on the rear surface side of the board installation member, the board installation member may be provided with a first spacer that is disposed between the plate portion and the second board to secure a space corresponding to a thickness of the first spacer.

According to this structure, because a space is secured between the plate portion and the second board, heat generated from the second board side is easily radiated compared with the structure in which the plate portion and the second board come into contact with each other (the space is not given).

In the foregoing structure, on the rear surface side, the leg portion and the connecting terminal may be so formed as to considerably protrude from the plate portion beyond the thickness of the first spacer.

According to this structure, when the second board is installed to come into contact with the first spacer, it is possible to allow the leg portion and the connecting terminal to easily come into contact with the second board.

In the structure described above, more specifically, on the rear surface side, the leg portion may be so formed as to protrude from the plate portion longer than the connecting terminal.

In the structure described above, on the first board's surface opposite to the board installation member, the first board may include a protruding part that has a given height from the surface, and the distance between the surface of the board installation member coming into contact with the first board and the surface of the board installation member coming into contact with the second board may be set longer than the given height.

According to this structure, it is possible to prevent the protruding part (e.g., an apparatus performing signal processing) on the rear surface side of the first board from interfering with the second board.

In the structure described above, a plurality of the leg portions may be formed, and each of the leg portions is inserted into each of a plurality of leg portion inserting holes disposed through the second board, and may be formed corresponding to the position of each of the leg portion inserting holes.

According to this structure, the position of each of the leg portions corresponds to the position of each of the leg portion inserting holes. Therefore, for example, when the step to install the board installation member on the second board is performed manually, it is possible to use each leg portion as a mark for the positioning.

In the structure described above, the leg portion is inserted into the leg portion inserting hole, and it may include a hook that engages with the second board to prevent the leg portion from coming off the leg portion inserting hole when the leg portion is inserted into the leg portion inserting hole.

According to this structure, it is possible to prevent the leg portion from easily coming off the leg portion inserting hole.

In the structure described above, the connecting terminal may be so formed that it has a protrusion shape that can be inserted into a connecting hole formed through the first board or the second board, and it includes an action portion that exerts elastic force on the inner surface of the connecting hole in the radial direction when it is inserted into the connecting hole.

According to this structure, it is easy to hold a relative positional relationship between the connecting terminal and the connecting hole by frictional force generated between the action portion of the connecting terminal and the inner surface of the connecting hole. Accordingly, for example, when fixing the connecting terminal and the connecting hole to each other by soldering, the fixing step can be performed easily.

In the structure described above, more specifically, the connecting terminal is formed of an elastic metal, and the action portion may be formed by bending a part of the connecting terminal.

In the foregoing structure, more specifically, on the rear surface side, the leg portion may be so formed as to protrude from each of the four corners of the plate portion in the direction substantially perpendicular to the plate portion.

Besides, in the above structure, at each of the four corners of the plate portion on the front surface side of the board installation member, the board installation member may be provided with a second spacer that is disposed between the plate portion and the first board to secure a space corresponding to a thickness of the second spacer.

According to this structure, because a space is secured between the plate portion and the first board, heat generated from the first board side is easily radiated compared with the structure in which the plate portion and the first board come into contact with each other (the space is not given). Also, it is possible to prevent a circuit pattern and the like of the first board from coming into contact with the plate portion.

In the structure described above, more specifically, the connecting terminal includes a first connecting terminal which transmits a signal output from a given tuner to the first board, a second connecting terminal which transmits a signal output from the first board to a given image apparatus, and a third connecting terminal which connects the first board with a ground point of the second board, wherein the first connecting terminal, the second connecting terminal, and the third connecting terminal may be each disposed along a different edge of the board installation member.

A board installation member according to the present invention including a plate portion that has an installation surface whose outer edge is substantially quadrilateral, wherein a given first board including a mount surface whose outer edge is substantially quadrilateral is installed on the installation surface (called a front surface) side, and the surface (called a rear surface) side of the rear side of the installation surface is installed on a given second board, the board installation member comprises a connecting terminal to electrically connect the first board with the second board, and a leg portion used for the installation on the second board, the connecting terminal protrudes from the plate portion in the direction substantially perpendicular to the plate portion on the front surface side and on the rear surface side, and comes into contact with the first board on the front surface side and comes into contact with the second board on the rear surface side, and the leg portion protrudes from the plate portion in the direction substantially perpendicular to the plate portion on the rear surface side.

According to this structure, it is possible to install the first board on the front surface side of the board installation member and to install the rear surface side of the board installation member on the second board. Accordingly, a chassis is not needed in the installation step in which a circuit board (the first board) is installed on another circuit board (the second board). Besides, the connecting terminal to electrically connect the first board with the second board, and the leg portion used for the installation on the second board is do disposed on the board installation member that it protrudes from the plate portion in the direction substantially perpendicular to the plate portion (substantially perpendicular to the front surface and to the rear surface). Accordingly, the installation step in which the first board is installed on the second board can be carried out as easily as possible.

In the foregoing structure, the plate portion is formed into a frame shape along the outer edge of the installation surface, and the outer edge's shape of the plate portion may be so formed as to be substantially congruent with the outer edge's shape of the mount surface of the first board.

According to this structure, even if an apparatus is disposed on the first board's surface opposite to the board installation member and an overhang of the apparatus is present on the surface, it is possible to prevent the overhang from interfering with the plate portion. Accordingly, the installation step to install the first board on the board installation member can be carried out easily. Besides, positioning is easy when installing the first board on the board installation member, and the installation step can be eased.

DESCRIPTION OF THE DRAWINGS

The above and other objects and features of the present invention will be more apparent from the following description of the preferred embodiments and the attached drawings, in which.

DESCRIPTION OF THE PREFERRED EMBODIMENTS

Figure 1:
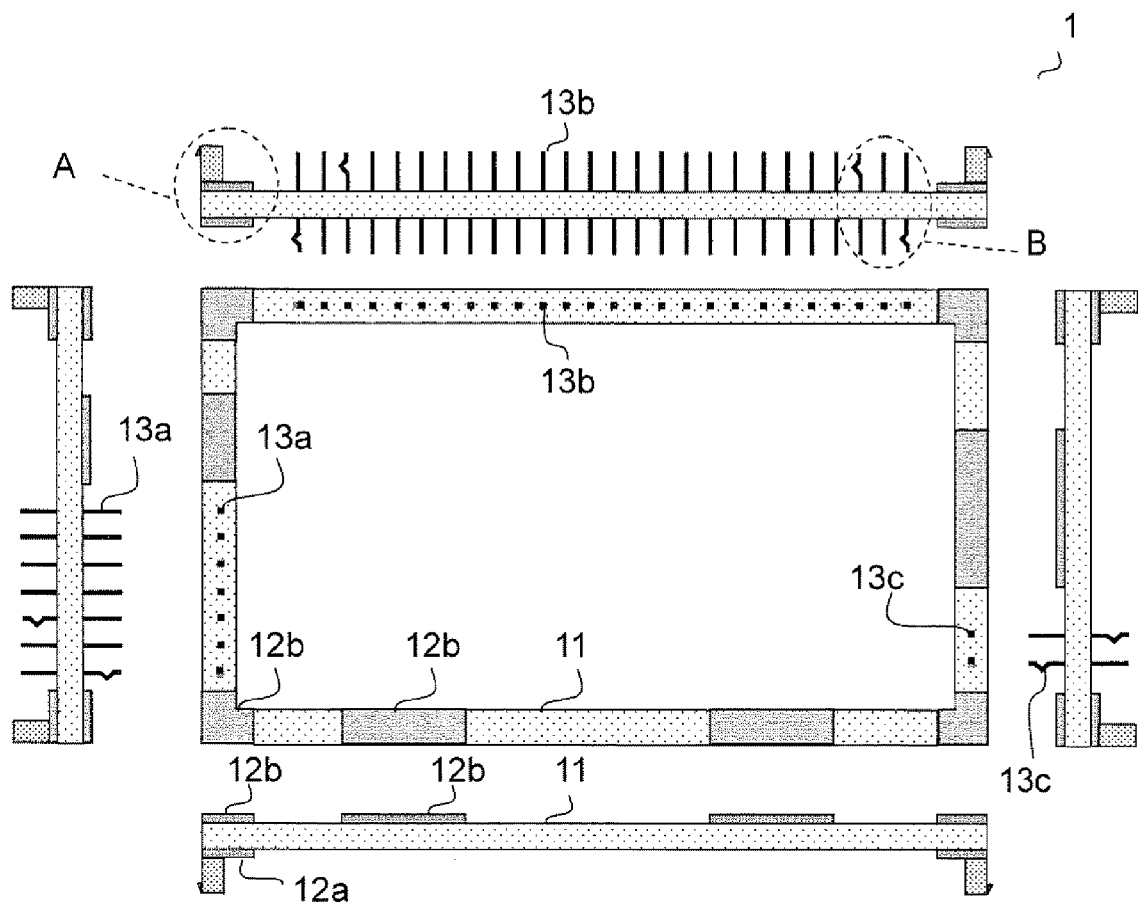
FIG. 1 is a structure view of a frame according to an embodiment of the present invention.
Figure 2:
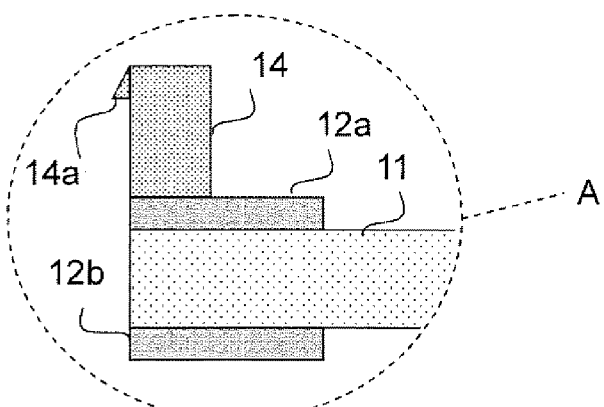
FIG. 2 is an enlarged view of an area indicated by a mark A in FIG. 1.
Figure 3:
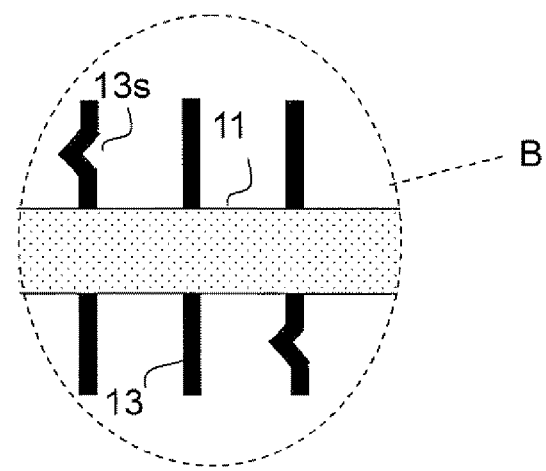
FIG. 3 is an enlarged view of an area indicated by a mark B in FIG. 1.

As an embodiment of the present invention, a receiving apparatus composed of a circuit board and a frame (board installation member) is explained below. First, a structure of a frame is explained referring to FIGS. 1 to 3. FIG. 1 shows the entire structure of the frame, FIG. 2 is an enlarged view of an area indicated by a mark A in FIG. 1, and FIG. 3 is an enlarged view of an area indicated by a mark B in FIG. 1. In FIG. 1, a view (a plan view) seen from the front side is shown at the center, and views (side views) seen from the top, bottom, right and left sides are shown around the plan view.

As shown in these figures, a frame 1 is provided with a plate portion 11, a first spacer 12a, a second spacer 12b, connecting terminals 13, leg portions 14 and the like.

The plate portion 11 is formed of a given insulation material, composed of a rectangular flat board which has the main surface (the largest surface) and whose outer edge is rectangular, and the inner part of the flat board is cut out into a rectangular shape. In other words, a frame shape is formed along the outer edge of the main surface. Besides, the outer-edge shape (the shape of the outer edge of a surface on which a sub-board described later is installed) of the main surface of the plate portion 11 is so formed as to be substantially congruent with the outer-edge shape of a mount surface of the sub-board.

The first spacer 12a is a plate member having a given thickness, and is installed at the four corners (in the vicinity of each corner of the rear surface side) of the plate portion 11 on the rear surface side of the frame 1. Thereby, as described later, when the frame 1 is installed on the main board, the first spacer 12a gives a space having the thickness of itself (which can be considered a step) between the frame 1 and the main board.

The second spacer 12b is a plate member having a given thickness, and is installed at the four corners (in the vicinity of each corner of the front surface side) of the plate portion 11 on the front surface side and also installed on other given places of the plate portion 11. Thereby, as described later, when the sub-board is installed on the fame 1, the second spacer 12b gives a space (which can be considered a step) having the thickness of itself between the frame 1 and the sub-board.

A plurality of connecting terminals (13a to 13c) are made of an elastic metal (an electroconductive material) that is formed into a slender shape, and go through a plurality of places of the plate portion 11 in the direction perpendicular to the main surface. In other words, the connecting terminals (13a to 13c) are each formed into a protrusion shape that is protruding from both the frond side and the rear side of the frame 1. Thereby, they serve to electrically connect the boards (the sub-board and the main board describe later) which are respectively installed on the front side and the rear side of the frame 1.

The connecting terminals (13a to 13c) protrude considerably beyond the thickness of the first spacer 12a on the rear surface side, and protrude considerably beyond the thickness of the second spacer 12b on the front surface side. Accordingly, when a circuit board is so installed that it comes into contact with the spacers (12a, 12b), it is easy to make the connecting terminals (13a to 13c) come into contact with the circuit board As the connecting terminals, the first connecting terminals 13a, the second connecting terminals 13b and the third connecting terminals 13c are disposed. The first connecting terminals 13a are disposed along an edge (the left edge in FIG. 1) of the plate portion 11, the second connecting terminals 13b are disposed along another edge (the upper edge in FIG. 1) of the plate portion 11, and the third connecting terminals 13c are disposed along a still another edge (the right edge in FIG. 1) of the plate portion 11.

Some of the plurality of connecting terminals (13a to 13c) are provided with a bent portion 13s that is so bent partially as to have a laid-on-side V shape as shown in FIG. 3. Thereby, when the connecting terminals are inserted into holes of terminal connection patterns (24a to 24c) described later and into connecting terminal insert holes 92, the bent portions 13s come into contact with the side surfaces of the holes. Consequently, force acts on the bent portion 13s in the direction to restore the bent portion 13s, and elastic force (which acts on the inner surface side of the hole in the radial direction) is generated to hold the shape of the bent portion 13s. As described later, this force holds a relative position between the frame 1 and the circuit board as stably as possible.

The leg portions 14 are so formed as to protrude from the four corners of the plate portion 11 in the direction perpendicular to the main surface on the rear surface side of the frame 1. The leg portions 14 protrude considerably from the plate portion 11 beyond the first spacer 12a and the connecting terminals (13a to 13c). The leg portions 14 may be so formed as to protrude via the first spacer 12a as shown in FIG. 2, or may be so formed as to protrude directly from the plate portion 11.

As shown in FIG. 2, a hook portion 14a (a small protrusion) protrudes from near the tip end of the leg portion 14. As described later, after the frame 1 is installed on the main board, the hook portion 14a serves to prevent the fame 1 from coming off the main board. According to this structure, the leg portion 14 is used to install the frame 1 on the main board described later.

Figure 4:
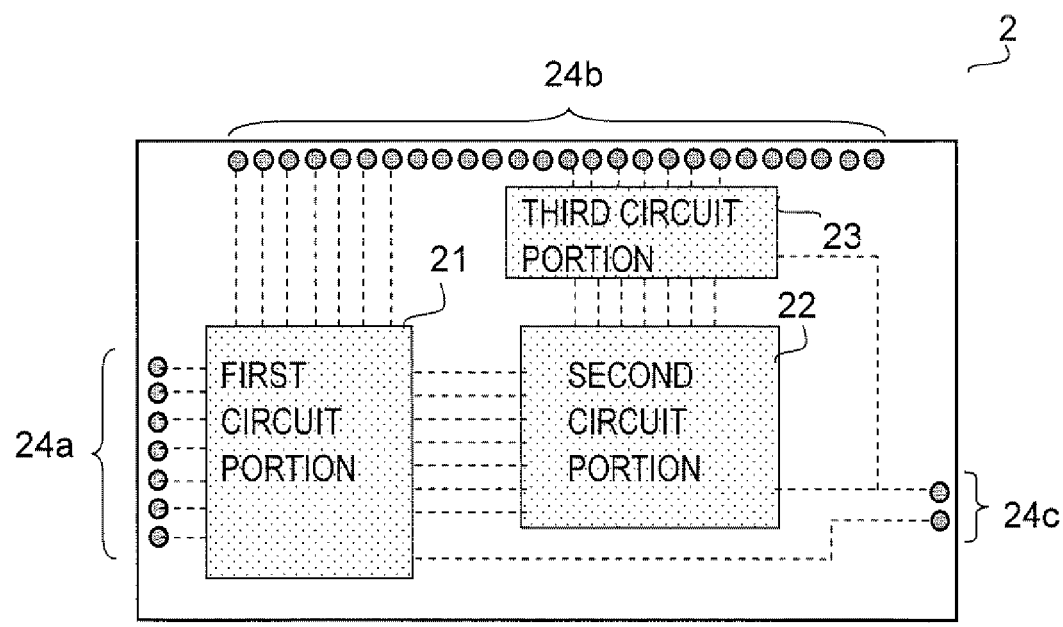
FIG. 4 is a structure view of a sub-board according to an embodiment of the present invention.

Next, a structure of a sub-board used for the receiving apparatus according to the present embodiment is explained referring to FIG. 4.

FIG. 4 is a schematic structure view of a sub-board 2 seen from the front side. As shown in this figure, the sub-board 2 comprises a first circuit portion 21, a second circuit portion 22, a third circuit portion 23 and terminal connecting patterns (24a to 24c). The first circuit portion 21 includes a circuit to demodulate an input signal. The second circuit portion 22 includes a circuit to decompress a compressed input signal. The third circuit portion 23 includes a circuit to convert input digital image and sound signals into analog image and sound signals.

The terminal connecting patterns (24a to 24c) include holes that go through the board so that the connecting terminals (13a to 13c) can be inserted into them. As shown in FIG. 4, as the terminal connecting patterns, the first terminal connecting patterns 24a, the second terminal connecting patterns 24b and the third terminal connecting patterns 24c are formed. The first terminal connecting patterns 24a are connected to the first circuit portion 21, the second terminal connecting patterns 24b are connected to the first circuit portion 21 and to the third circuit portion 22, and the third terminal connecting patterns 24c are connected to the first to third circuit portions (21 to 23).

Each of the first terminal connecting patterns 24a is formed at the position corresponding to each of the first connecting terminals 13a. Each of the second terminal connecting patterns 24b is formed at the position corresponding to each of the second connecting terminals 13b. Each of the third terminal connecting patterns 24c is formed at the position corresponding to each of the third connecting terminals 13c.

Next, a structure of the receiving apparatus according to the present embodiment is explained.

Figure 5:
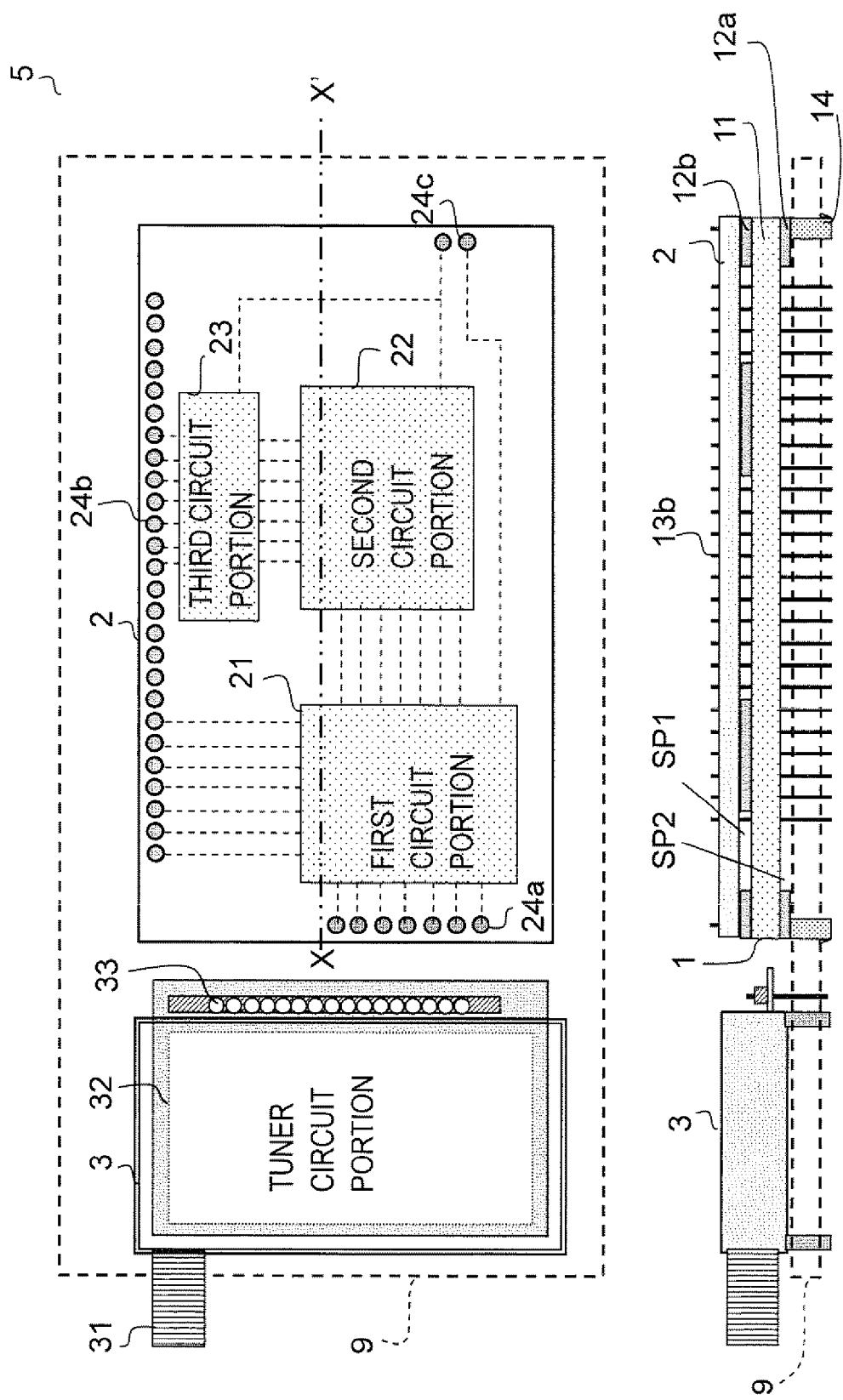
FIG. 5 is a structure view of a receiving apparatus according to an embodiment of the present invention.
Figure 8:
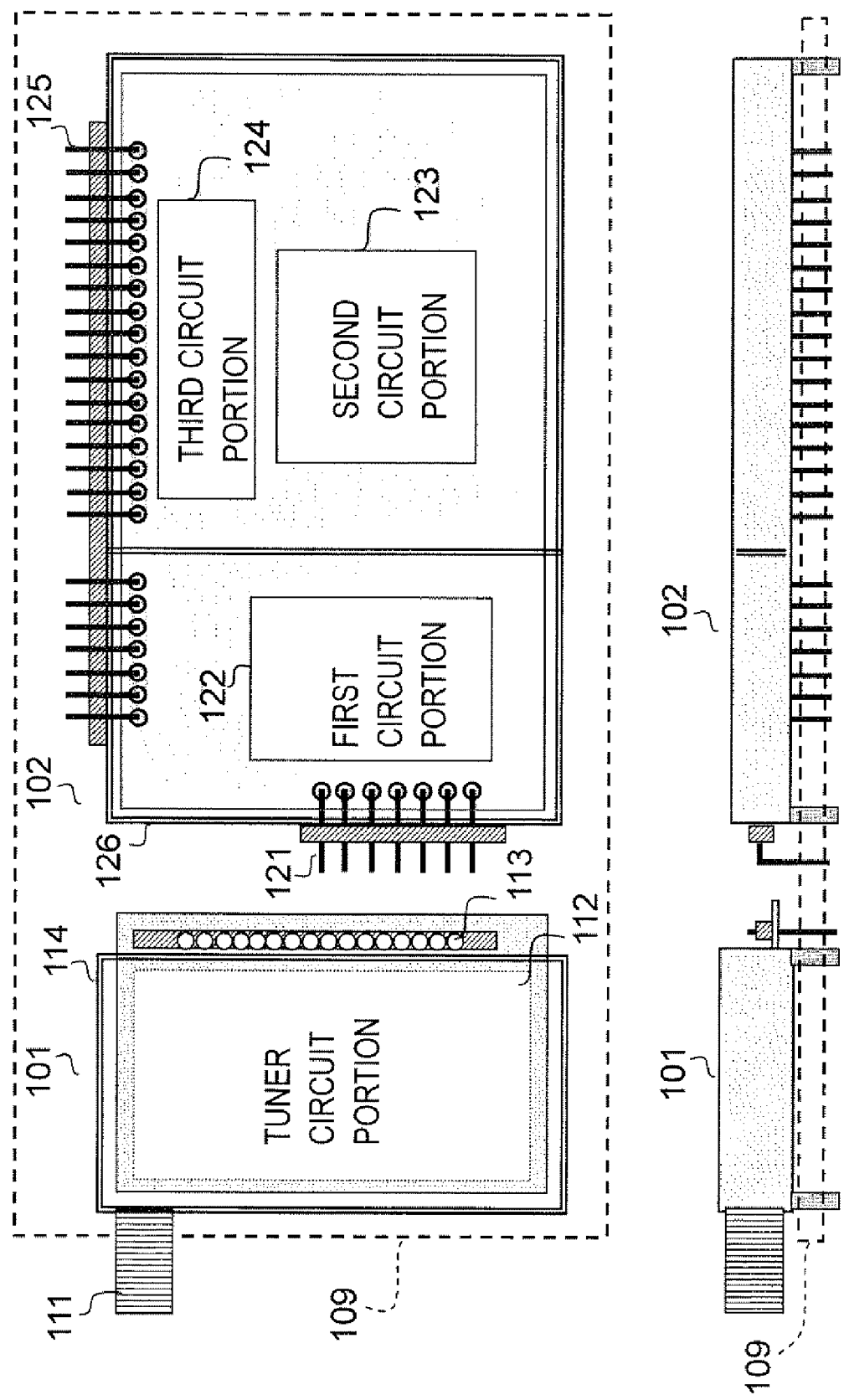
FIG. 8 is a structure view of a conventional receiving apparatus.

As shown in FIG. 5, the receiving apparatus 5 is comprised of a main board 9, and a tuner portion 3 and the sub-board 2 that are installed on the main board 9. The tuner portion 3 has the same structure as that of the tuner portion 101 shown in FIG. 8 and has functions as a general tuner.

More specifically, the tuner portion 3 comprises a tuner input terminal 31, a tuner circuit portion 32, and an output terminal for an intermediate-frequency signal. Broadcast signals input to the tuner input terminal 31 are transmitted to the tuner circuit portion 32, where a predetermined-frequency signal is extracted (selected) from the broadcast signals. The extracted signal is converted into an intermediate-frequency signal and output to a wiring pattern of the main board 9 via the output terminal 33.

The sub-board 2 is installed on the frame 1 in the first step, and the frame 1 is installed on the main board 9 in the second step, thereby the sub-board 2 is installed on the main board 9.

In the first step, more specifically, first, the sub-board 2 is so placed on the frame 1 that the rear surface side of the sub-board 2 faces the front surface side of the frame 1, and the outer edge of the sub-board 2 and the outer edge of the frame 1 overlay with each other when seen from the direction perpendicular to the main surface. The connecting terminals (13a to 13c) penetrate through the holes of the terminal connecting patterns (24a to 24c) corresponding thereto. Under this state, the connecting terminals (13a to 13c) are fixed to the terminal connecting patterns (24a to 24c) corresponding thereto by soldering. Because the outer edge of the sub-board 2 and the outer edge of the frame 1 have rectangular shapes substantially congruent with each other, the sub-board 2 can be placed on the frame 1 to overlay with each other as described above. Accordingly, the positioning between the sub-board 2 and the frame 1 is easy.

As described above, some of the connecting terminals (13a to 13c) are provided with a bent portion 13s. Therefore, after the sub-board 2 is placed on the frame 1, the bent portion 13s exerts elastic force on the inner surface of the hole of the terminal connecting pattern 24 in the radial direction. Accordingly, the positional relationship between the sub-board 2 and the frame 1 can be prevented from becoming unstable (the sub-board 2 becomes loose), and the soldering step can be performed easily.

Besides, when the sub-board 2 is placed on the frame 1, it comes into contact with the second spacer 12b. Thus, the sub-board 2 does not come into contact with the plate portion 11, and as shown in FIG. 5, a space SP1 having a thickness of the second spacer 12b is formed therebetween. Accordingly, the contact area between the sub-board 2 and the frame 1 is relatively small, and it is easy for the sub-board 2 to radiate heat. Also, it is possible to prevent the circuit pattern of the sub-board 2 from coming into contact with the plate portion 11.

Figure 6:
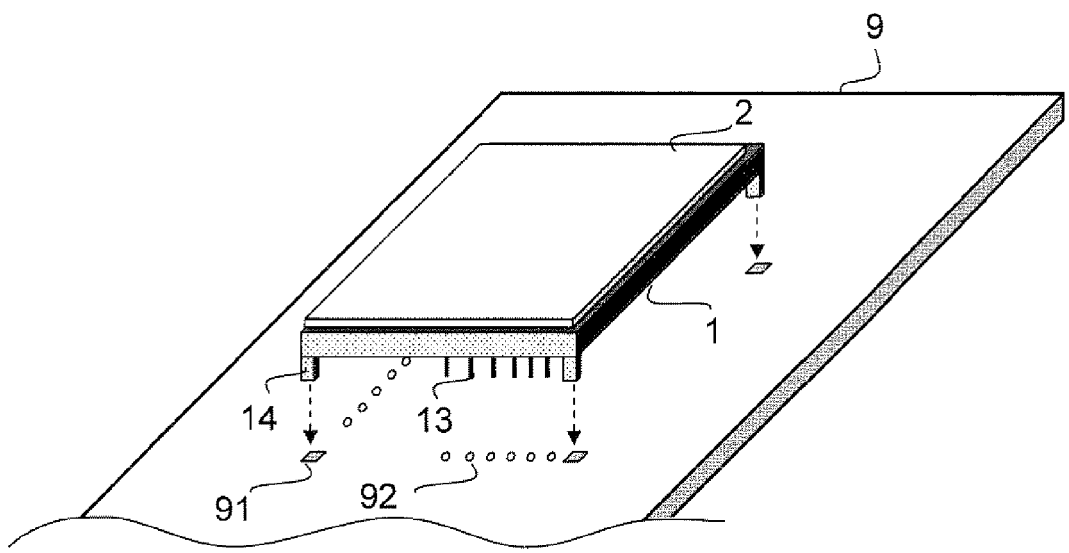
FIG. 6 is a view to explain how a frame is placed on a main board.

In the second step described above, more specifically, as shown in FIG. 6, first, the frame 1 is placed on the main board 9 in such a manner that the leg portions 14 are inserted into the leg portion insert holes 91. Each of the leg portion insert holes 91 is so sized in diameter to allow the protruding part of the leg portion 14 to be smoothly inserted thereinto, and is formed at the position corresponding to the position of each of the leg portions 14.

Thereby, in the step to place the frame 1 on the main board 9, the leg portions 41 and the leg portion insert holes 91 serve to define the positional relationship between the frame 1 and the main board 9. Accordingly, if the step to install the frame 1 on the main board is carried out manually, it is possible to use the leg portions 41 as marks for the positioning in this step.

The main board 9 is also provided with connecting terminal insert holes 92 corresponding to the positions of the connecting terminals (13a to 13c). Therefore, when the frame 1 is placed on the main board 9, the connecting terminals (13a to 13c) are inserted into the connecting terminal insert holes 92.

Once the frame 1 is placed on the main board 9, the leg portions 41 go through the leg portion insert holes 91, consequently, the hook portions 14a formed at the tip ends of the leg portions 41 engage with the rear surface side (the rear side opposite to the surface facing the frame 1) of the main board 9. Further, the bent portion 13s of the connecting terminal 13 exerts elastic force on the inner surface of each of the connecting terminal insert hole 92 in the radial direction.

Consequently, after the frame 1 is placed on the main board 9, it is hard for the frame 1 to come off the main board 9. Besides, under this state, because the connecting terminals (13a to 13c) and the main board 9 are connected with each other by soldering, the soldering step can be performed easily.

When the frame 1 is placed on the main board 9, the main board 9 comes into contact with the first space 12a. Thus, the main board 9 and the plate portion 11 do not come into contact with each other, and a space SP2 having a thickness of the first spacer 12a is formed therebetween as shown in FIG. 5. Accordingly, the contact area between the main board 9 and the frame 1 is relatively small, and it is easy for the main board 9 to radiate heat.

Figure 7:
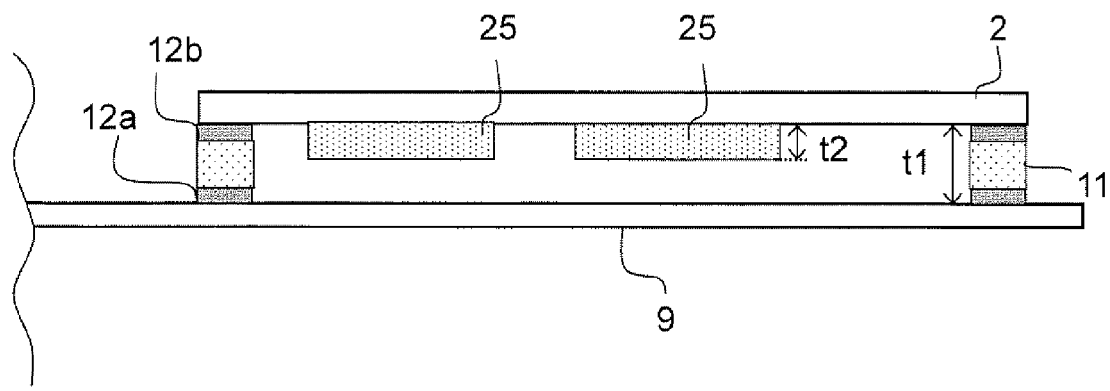
FIG. 7 is a schematic sectional view taken along the X-X' line in FIG. 5.

Here, a schematic sectional view taken along the X-X' line in FIG. 5 is shown in FIG. 7 (provided the connecting terminals are omitted). As shown in this figure, the sum (t1 in this figure) of the thicknesses of the plate portion 11, the first spacer 12a and the second spacer 12b of the frame 1 is determined larger than the height (t2 in this figure) of an overhang part 25 (e.g., an apparatus to perform signal processing) protruding from the rear surface side of the sub-board 2.

The t1 described above can be considered as the distance between the surface of the frame 1 touching with the sub-board 2 and the surface of the frame 1 touching with the main board 9. According to this structure, the overhang part 25 on the rear surface side of the sub-board 2 does not interfere with the main board 9.

Next, operation of the receiving apparatus according to the present embodiment is explained.

First, broadcast signals received by an antenna, not shown, are input to the tuner input terminal 31. Here, a broadcast signal is for a digital television broadcast. A broadcast signal is generated by the process where information (information on digital images and sounds) on contents of a television program is compressed and modulated.

The broadcast signals input to the tuner input terminal 31 are input into the tuner circuit portion 32. The tuner circuit portion 32 extracts (selects) a predetermined-frequency signal from the input broadcast signals and converts it into an intermediate-frequency signal. This intermediate-frequency signal is output from the output terminal 33 and input into the first circuit portion 21 via the wiring pattern of the main board 9, the first connecting terminals 13a and the first terminal connecting patterns 24a.

The first circuit portion 21 demodulates the input signal and outputs it to the second circuit portion 22. The second circuit portion 22 decompresses the input signal to obtain information on image and sound for the digital television broadcast program and outputs the information to the third circuit portion 23. The third circuit portion 23 converts the input digital information on image and sound into analog information on image and sound, and outputs it to an image apparatus, not shown, via the second connecting patterns 24b and the second connecting terminals 13b. The image apparatus outputs image and sound based on the input analog image and sound information.

As explained above, the receiving apparatus 5 applies the predetermined processing to the received broadcast signals using the circuits disposed on the sub-board 2. The receiving apparatus 5 may be configured to include an antenna on the previous stage to the tuner input terminal 31, thereby the receiving apparatus 5 can receive a broadcast signal (a broadcast wave) by itself.

The circuit portions (21 to 23) are connected to the third connecting terminals 13c via the third terminal connecting patterns 24c, and the third connecting terminals 13c are connected to a ground pattern disposed in the main board 9. Thus, the ground point for the circuit portions (21 to 23) is secured.

Focusing on the functions of the connecting terminals, the first connecting terminals 13a transmit a signal output from the tuner portion 3 to the sub-board 2, the second connecting terminals 13b transmit a signal output from the sub-board 2 to an image apparatus, not shown, and the third connecting terminals 13c connect the sub-board 2 to the ground pattern (ground point) disposed in the main board 9.

As explained above, the receiving apparatus 5 according to the present embodiment comprises the sub-board 2 having the mount surface whose outer edge is rectangular. Also, the receiving apparatus 5 comprises the frame 1 that includes the plate portion 11 having the installation surface whose outer edge is rectangular (congruent with the outer edge of the sub-board 2), the sub-board 2 is installed on the installation surface (the front surface) side, and the surface (the rear surface) side of the rear side of the installation surface is installed on the main board 9.

The frame 1 includes the connecting terminals (13a to 13c) to electrically connect the sub-board 2 and the main board 9 with each other, and the leg portions 14 used for the installation on the main board 9. The connecting terminals (13a to 13c) protrude from the plate portion 11 in the direction substantially perpendicular to the plate portion 11 on the front surface and rear surface sides. The connecting terminals (13a to 13c) touch with the sub-board 2 on the front surface side, while they touch with the main board 9 on the rear surface side. The leg portions 14 protrude from the plate portion 11 in the direction substantially perpendicular to the plate portion 11 on the rear surface side of the frame 1.

According to the structure described above, it is possible to install the sub-board 2 on the front surface side of the fame 1 and to install the rear surface side of the frame 1 on the main board 9. Accordingly, in the step to install the sub-board 2 on the main board 9, a chassis and the like are not needed. Accordingly, size reduction of the product due to the removal of a chassis, simplification of the fabricating processes, and reduction of material costs are eased.

The frame 1 is provided with the connecting terminals (13a to 13c) to electrically connect the sub-board 2 and the main board 9 with each other and with the leg portions 14 used for the installation on the main board 9. The connecting terminals (13a to 13c) and the leg portions 14 are so disposed as to protrude from the plate portion 11 in the direction substantially perpendicular (in the direction perpendicular to the front surface and the rear surface) to the plate portion 11. Accordingly, it is possible to carry out the step to install the sub-board 2 on the main board 9 as easily as possible Because the plate portion 11 of the fame 1 is formed into a frame shape along the outer edge of the main surface (the installation surface of the sub-board 2), even if an overhang is present on the rear surface of the sub-board 2, it is possible to prevent the overhang and the plate portion 11 from interfering with each other. Accordingly, the step to install the sub-board 2 on the frame 1 can be easily performed.

The shape of the outer edge of the mount surface of the sub-board 2 is substantially congruent with the shape of the outer edge of the plate portion 11. Accordingly, the positioning in installing the sub-board 2 on the frame 1 is easy, and the installation step can be carried out easily.

The embodiments of the present invention are not limited to those descried above, and various modifications can be made without departing from the scope of the present invention.

In the receiving apparatus and board installation member explained as the embodiments of the present invention, it is possible to install the first board on the front surface side of the board installation member, and to install the rear surface side of the board installation member on the second board. Accordingly, in the step to install a circuit board (the first board) on another circuit board (the second board), a chassis and the like are not required. Besides, the board installation member is provided with the connecting terminals to electrically connect the first board and the second board with each other and the leg portions for the installation on the second board, and the connecting terminals and the leg portions are so disposed as to protrude from the plate portion in the direction substantially perpendicular to the plate portion (in the direction substantially perpendicular to the front surface and the rear surface). Accordingly, the step to install the first board on the second board can performed as easily as possible.

What is claimed is:

1. A receiving apparatus, comprising:
   a first board including a mount surface whose outer edge is substantially quadrilateral; and
   a board installation member including a plate portion that has an installation surface whose outer edge is substantially quadrilateral, the first board is installed on the installation surface (called a front surface) side and the surface (called a rear surface) side of the rear side of the installation surface is installed on a given second board, the apparatus applies a predetermined processing to a received broadcast signal using a circuit disposed on the first board, and
   the board installation member includes:
      a connecting terminal to electrically connect the first board with the second board; and
      a leg portion used for the installation on the second board, the connecting terminal protrudes from the plate portion in the direction substantially perpendicular to the plate portion on the front surface side and on the rear surface side, and comes into contact with the first board on the front surface side and comes into contact with the second board on the rear surface side, and
      the leg portion protrudes from the plate portion in the direction substantially perpendicular to the plate portion on the rear surface side.

2. The receiving apparatus according to claim 1, wherein the plate portion is formed into a frame shape along the outer edge of the installation surface.

3. The receiving apparatus according to claim 1, wherein at each of the four corners of the plate portion on the rear surface side of the board installation member, the board installation member is provided with a first spacer that is disposed between the plate portion and the second board to secure a space corresponding to a thickness of the first spacer.

4. The receiving apparatus according to claim 1, wherein on the rear surface side, the leg portion protrudes from the plate portion longer than the connecting terminal.

5. The receiving apparatus according to claim 1, wherein the leg portion is inserted into a leg portion inserting hole disposed through the second board, and is formed corresponding to the position of the leg portion inserting hole.

6. The receiving apparatus according to claim 1, wherein the leg portion is inserted into a leg portion inserting hole disposed through the second board, and includes a hook that engages with the second board to prevent the leg portion from coming off the leg portion inserting hole when the leg portion is inserted into the leg portion inserting hole.

7. The receiving apparatus according to claim 1, wherein the connecting terminal includes: a protrusion shape that can be inserted into a connecting hole formed through the first board or the second board; and an action portion that exerts elastic force on the inner surface of the connecting hole in the radial direction when it is inserted into the connecting hole.

8. The receiving apparatus according to claim 1, wherein on the rear surface side, the leg portion protrudes from each of the four corners of the plate portion in the direction substantially perpendicular to the plate portion.

9. The receiving apparatus according to claim 1, wherein at each of the four corners of the plate portion on the front surface side of the board installation member, the board installation member is provided with a second spacer that is disposed between the plate portion and the first board to secure a space corresponding to a thickness of the second spacer.

10. The receiving apparatus according to claim 1, wherein the connecting terminal includes: a first connecting terminal which transmits a signal output from a given tuner to the first board; a second connecting terminal which transmits a signal output from the first board to a given image apparatus; and a third connecting terminal which connects the first board with a ground point of the second board, wherein the first connecting terminal, the second connecting terminal, and the third connecting terminal are each disposed along a different edge of the board installation member.

11. The receiving apparatus according to claim 2, wherein the shape of the outer edge of the mount surface of the first board is substantially congruent with the shape of the outer edge of the plate portion.

12. The receiving apparatus according to claim 2, wherein on the first board's surface opposite to the board installation member, the first board includes a protruding part that has a given height from the surface, and the distance between the surface of the board installation member coming into contact with the first board and the surface of the board installation member coming into contact with the second board is set longer than the given height.

13. The receiving apparatus according to claim 3, wherein on the rear surface side, the leg portion and the connecting terminal protrude considerably from the plate portion beyond the thickness of the first spacer.

14. The receiving apparatus according to claim 7, wherein the connecting terminal is formed of an elastic metal, and the action portion is formed by bending a part of the connecting terminal.

15. A board installation member including a plate portion that has an installation surface whose outer edge is substantially quadrilateral, wherein a given first board including a mount surface whose outer edge is substantially quadrilateral is installed on the installation surface (called a front surface) side, and the surface (called a rear surface) side of the rear side of the installation surface is installed on a given second board, the board installation member comprising:
   a connecting terminal to electrically connect the first board with the second board; and
   a leg portion used for the installation on the second board, wherein the connecting terminal protrudes from the plate portion in the direction substantially perpendicular to the plate portion on the front surface side and on the rear surface side, and comes into contact with the first board on the front surface side and comes into contact with the second board on the rear surface side, and
   the leg portion protrudes from the plate portion in the direction substantially perpendicular to the plate portion on the rear surface side.

16. The board installation member according to claim 15, wherein the plate portion is formed into a frame shape along the outer edge of the installation surface, and the shape of the outer edge of the plate member is substantially congruent with the shape of the outer edge of the mount surface of the first board.

* * * * *